(12) United States Patent
Ma

(10) Patent No.: US 10,433,385 B2
(45) Date of Patent: Oct. 1, 2019

(54) DIMMING SYSTEM FOR LED LAMPS

(71) Applicants: Self Electronics Co., Ltd., Ningbo, Zhejiang (CN); Wanjiong Lin, Ningbo, Zhejiang (CN); Self electronics USA Corporation, Norcross, GA (US)

(72) Inventor: Xuhong Ma, Zhejiang (CN)

(73) Assignee: Self Electronics Co., Ltd., Ningbo (CN)

( * ) Notice: Subject to any disclaimer, the term of this patent is extended or adjusted under 35 U.S.C. 154(b) by 0 days.

(21) Appl. No.: 16/163,268

(22) Filed: Oct. 17, 2018

(65) Prior Publication Data

US 2019/0141808 A1 May 9, 2019

(30) Foreign Application Priority Data

Nov. 3, 2017 (CN) .......................... 2017 1 1068245

(51) Int. Cl.
*H05B 33/08* (2006.01)
(52) U.S. Cl.
CPC ..... *H05B 33/0845* (2013.01); *H05B 33/0815* (2013.01); *H05B 33/0818* (2013.01); *Y02B 20/346* (2013.01)
(58) Field of Classification Search
CPC ............ H05B 33/0845; H05B 33/0818; H05B 33/08; H05B 33/0815; Y02B 20/346

USPC ......................................................... 315/291
See application file for complete search history.

(56) References Cited

U.S. PATENT DOCUMENTS

| 8,212,493 | B2* | 7/2012 | Melanson | ........... | H02M 3/3374 |
|---|---|---|---|---|---|
| | | | | | 315/247 |
| 2018/0007753 | A1* | 1/2018 | Kuang | ............... | H05B 33/0815 |
| 2018/0310372 | A1* | 10/2018 | You | .................... | H05B 33/0848 |
| 2019/0052176 | A1* | 2/2019 | Yabuzaki | .......... | H02M 3/33523 |

* cited by examiner

*Primary Examiner* — Daniel D Chang
(74) *Attorney, Agent, or Firm* — Wang Law Firm, Inc.

(57) ABSTRACT

A dimming system for LED lamps, comprising a DC/DC converter, a dimming signal input module, a brightness value conversion module electrically connected to the dimming signal input module, and a dimming signal switching threshold setting module, a first signal output module, and a second signal output module. The dimming signal input module is configured to input a dimming signal. And when the brightness value is greater than or equal to the dimming signal switching threshold, the value of the amplitude dimming voltage output by the first signal output module is equal to the dimming signal switching threshold and the second signal output module outputs one PWM signal. The PWM signal modulates the amplitude dimming voltage having a magnitude equal to the dimming signal switching threshold to adjust the output of the DC/DC converter.

9 Claims, 2 Drawing Sheets

DIMMING SYSTEM FOR LED LAMPS

CROSS-REFERENCE TO A RELATED APPLICATION

This application claims priority to a Chinese Patent Application No. CN 201711068245.8, filed on Nov. 3, 2017.

FIELD OF THE TECHNOLOGY

The present invention relates to lighting system, with particular emphasis on a Dimming system for LED lamps.

BACKGROUND

In general daily life, various lighting devices can be seen everywhere, such as fluorescent lamps, street lamps, table lamps, art lamps, and the like. In the above lighting apparatus, a tungsten filament bulb is conventionally used as a light source. In recent years, due to the rapid development of technology, light-emitting diodes (LEDs) have been used as sources of illumination. In addition, in addition to lighting equipment, for general traffic signs, billboards, lights, etc., also use LEDs as a light source. As mentioned above, the use of light-emitting diodes as light-emitting sources has the advantages of power saving and greater brightness, so it has gradually become common in use.

With the development of lighting technology, people are increasingly demanding light sources, especially dimming functions. At present, dimming function has become a must-have function of LED lamps, especially in the North American market. At the same time, with the development of the industry, people no longer only pursue the dimming function, but also require the quality of dimming, that is, high requirements about no stroboscopic lighting, dimming depth, even softness, comfort, etc. A conventional LED constant current drive scheme has a DC/DC converter that converts the varying input current into a constant current output of varying amplitude. Therefore, the conventional LED constant current driving scheme is the mainstream of the current market, and has the advantages of simple circuit, high stability, fast response, no compensation, high efficiency, and can be dimmed using PWM signals, or dimmed by amplitude. However, due to the structure and working principle of the DC/DC converter itself, if the dimming is only performed by the amplitude, the dimming depth is not enough for the occasions requiring high dimming performance, generally only 10%. Up to 20%, not to mention 1% or lower dimming depth, and the lower the dimming depth, the lower the accuracy. If only PWM dimming is used, due to the characteristics of the PWM signal itself, that is, there is a duty cycle, there will inevitably be stroboscopic. In order to reduce the stroboscopic factor, only the frequency of PWM dimming is increased. However, as the dimming frequency increases, the operating frequency of the DC/DC converter must also increase accordingly, thereby ensuring the stability and accuracy of the DC/DC converter. At the same time, the increase of the operating frequency of the DC/DC converter will inevitably lead to the problem of reduced efficiency and EMI degradation.

SUMMARY OF THE INVENTION

Therefore, It is necessary to provide a dimming system for LED lamps to solve the above problem.

A dimming system for LED lamps, comprising a DC/DC converter, a dimming signal input module, and a brightness value conversion module electrically connected to the dimming signal input module, a dimming signal switching threshold setting module, a first signal output module, and a second signal output module, the dimming signal input module is configured to input a dimming signal, the brightness value conversion module is configured to convert the dimming signal into a brightness value, and the dimming signal switching threshold setting module is configured to preset a size of the dimming signal switching threshold to determine which one of the first and second signal output modules to control the output of the DC/DC converter, and when the brightness value is greater than the dimming signal switching threshold, the first signal output module outputs an amplitude dimming voltage to adjust the output of the DC/DC converter and turning off the output of the second signal output module, when the brightness value is greater than or equal to the dimming signal switching threshold, the value of the amplitude dimming voltage output by the first signal output module is equal to the dimming signal switching threshold while the second signal output module outputs a PWM signal, and the PWM signal modulates the amplitude dimming voltage whose amplitude is equal to the dimming signal switching threshold and then adjusts the output of the DC/DC converter.

Advantageously, the dimming system for LED lamps further includes a determining module, and the determining module is configured to determine whether the brightness value output by the brightness value conversion module is greater than the dimming signal switching threshold.

Advantageously, the input signal of the dimming signal input module is an analog signal of 0 to 10 volts or a PWM digital signal.

Advantageously, the first signal output module includes a first PWM signal output unit, and a filtering unit, and the first PWM signal output unit outputs a corresponding PWM signal according to the dimming signal of the input of the dimming signal input module, the filtering unit includes a resistor R6 and a capacitor C1.

Advantageously, the resistor R6 is connected in series between the first PWM signal output unit and the DC/DC converter, and one end of the capacitor C1 is electrically connected between the resistor R6 and the DC/DC converter, and the other end of the capacitor C1 is grounded.

Advantageously, the second signal output module includes a second PWM signal output unit, and a MOS transistor, the drain of the MOS transistor is electrically connected between the resistor R6 and the DC/DC converter, and the source is grounded, the gate is electrically connected to the second PWM signal output unit.

Advantageously, when the brightness value is greater than the dimming signal switching threshold, the first PWM signal output unit outputs a corresponding first PWM signal according to an output dimming signal of the dimming signal input module, the dimming system for LED lamps further includes a shutdown module, when the brightness value is greater than the dimming signal switching threshold, the shutdown module turns off an output of the second PWM signal output unit to turn off the MOS transistor.

Advantageously, when the brightness value is less than or equal to the dimming signal switching threshold, the second PWM signal output unit outputs a corresponding second PWM signal according to the output dimming signal by the dimming signal input module, the first PWM signal output unit outputs a corresponding first PWM signal according to the output dimming signal by the dimming signal input module and is filtered by the filtering unit to form a constant voltage value.

Advantageously, the magnitude of the constant voltage value is equal to the dimming signal switching threshold.

Compared with the prior art, the dimming system for LED lamps provided by the present invention, when high brightness, that is, when the brightness value output by the brightness value conversion module is greater than the dimming signal switching threshold, due to use the amplitude dimming voltage for dimming so that true dimming without strobe can be achieved. In the case of low brightness, that is, when the brightness value output by the brightness value conversion module is less than or equal to the dimming signal switching threshold, a lower analog voltage value, that is, the dimming signal switching threshold is used to adjust the dimming PWM signal with higher frequency to achieve dimming, so that the dimming depth can be adjusted infinitely, that is, the lamp to which the DC/DC converter is connected can be completely dark, furthermore, it can not only achieve the purpose of no stroboscopic, but also deepen the purpose of adjusting the depth of light.

DETAILED DESCRIPTION OF THE DRAWINGS

The drawings described herein are intended to promote a further understanding of the present invention, as follows.

DESCRIPTION OF THE PREFERRED EMBODIMENTS

The present application is illustrated by way of the following detailed description based on of the accompanying drawings. It should be noted that illustration to the embodiment in this application is not intended to limit the invention.

Figure 1:
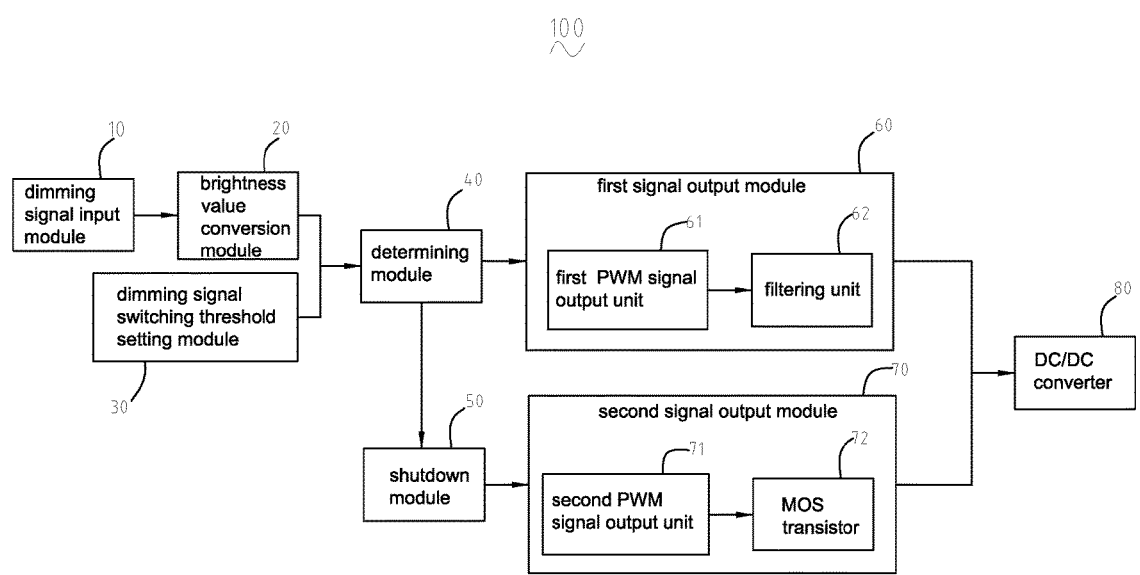
FIG. 1 is a schematic block diagram of a dimming system for LED lamps provided by the present invention.
Figure 2:
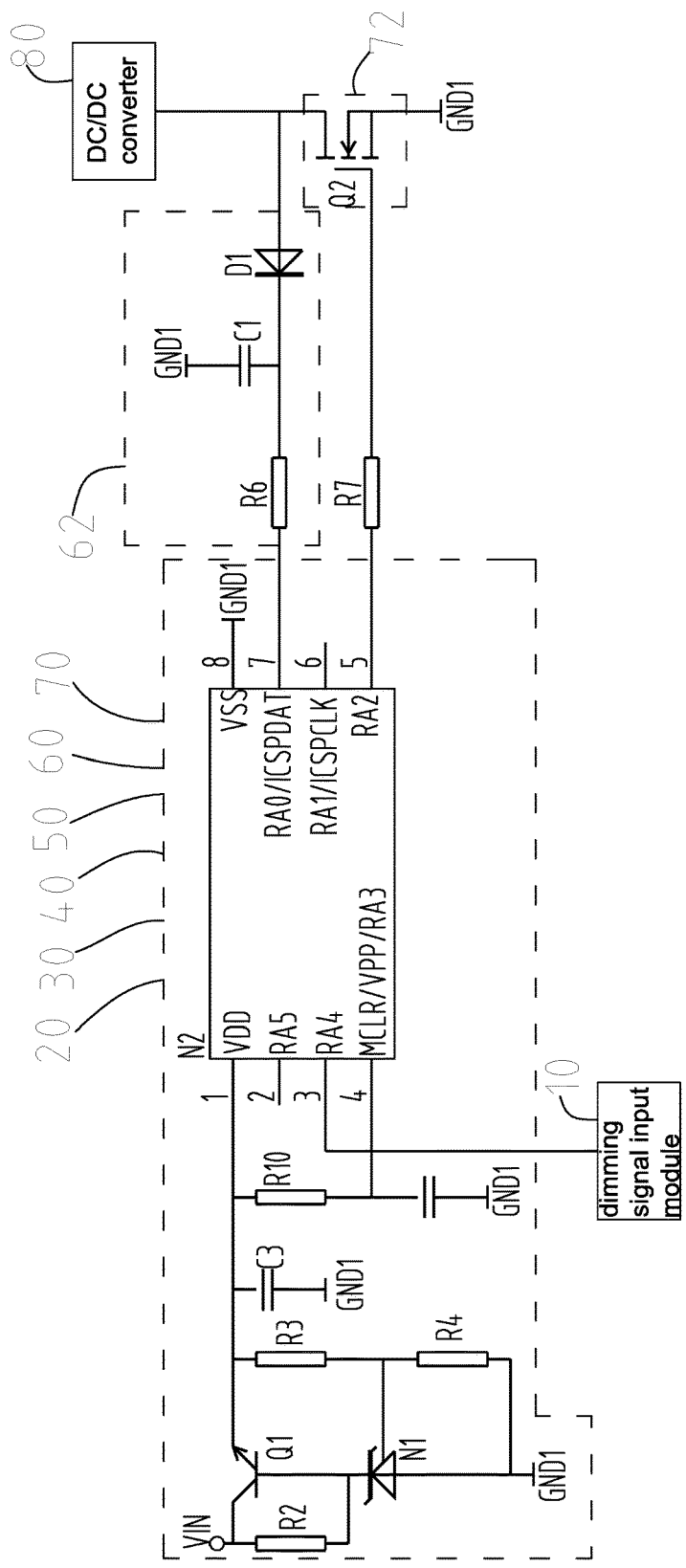
FIG. 2 is a circuit diagram of the dimming system for LED lamps of FIG. 1.

Please refer to FIG. 1 to FIG. 2, which are schematic block diagrams and circuit diagrams of a dimming system 100 for LED lamps provided by the present invention. The dimming system 100 for LED lamps includes a dimming signal input module 10, a brightness value conversion module 20 electrically connected to the dimming signal input module 10, and a dimming signal switching threshold setting module 30, a determining module 40, a shutdown module 50, a first signal output module 60, and a second signal output module 70, and a DC/DC converter 80 controlled by the first and second signal output modules 60, 70. It can be understood that the dimming system 100 for LED lamps further includes other functional modules common to some LED lamp power sources, such as a filtering module, a power conversion module, a rectifying module, etc., which should be learned by those skilled in the art. The known technology will not be described in detail here.

First, the characteristics of the DC/DC converter 80 need to be explained so that the technical solution of the present invention can be more fully explained. The DC/DC converter 80 is a switching power supply chip in an existing technology, which can be used for step-up and step-down, and utilizes the characteristics of energy storage of capacitors and inductors to perform the action of the high frequency switch through a controllable switch (MOSFET, etc.). The action of the switch stores the input electrical energy in the capacitance (sensing). When the switch is turned off, the electrical energy is released to the load to provide energy. The power or voltage capability of the output is related to the duty cycle (the ratio of the on-time of the switch to the period of the entire switch). Therefore, in the present embodiment, the structure and operation principle of the DC/DC converter 80 will not be described in detail, and only the operational characteristics will be described. As shown in FIG. 3, it is a graph when the DC/DC converter 80 is controlled by analog amplitude current. In FIG. 3, FIG. (a) is a graph of analog amplitude dimming of a certain DC/DC converter, and FIG. (b) is a graph of PWM dimming of a certain DC/DC converter. In Figure (a), the abscissa is the amplitude dimming voltage and the ordinate is the output current of the DC/DC converter. As can be seen from Figure (a), when using analog amplitude dimming, the maximum output current of the DC/DC converter is 500 mA, and the minimum output current is 100 mA, that is, the DC/DC converter cannot output 0 to 100 mA current. That is to say, when using amplitude dimming, there is a range of about 20% that cannot be dimmed. It is of course conceivable that the maximum output current of the DC/DC converter is 500 mA, and the minimum output current of 100 mA is determined by the inherent characteristics of the DC/DC converter 80 itself. Different DC/DC converters, when dimming by amplitude dimming voltage, can have arbitrary maximum and minimum output current. In Figure (b), the abscissa is the PWM duty cycle value and the ordinate is also the output current of the DC/DC converter. As can be seen from Figure (b), when the duty cycle of the PWM is close to zero, the output current of the DC/DC converter will also be close to zero. Therefore, it can be considered that the PWM dimming will have a deep dimming depth, that is, when PWM dimming is used, the brightness of the lamp can vary from 0 to 100%. However, when PWM dimming is used, both stroboscopic and EMI will be an unsolvable problem.

The dimming signal input module 10 outputs a dimming signal, which may be an analog signal of 0 to 10 volts, or a PWM digital signal generated by a PWM signal generator, or may be a dimming signal resulting from WIFI or DALI wireless device. As for the structure and working principle of the 0 to 10 volt dimmer, or the PWM signal generator, or the WIFI or DALI dimmer, it should be a technique known to those skilled in the art, and details are not described herein. The dimming signal input module 10 is electrically connected to the brightness value conversion module 20 to transmit a dimming signal of the user to the dimming system 100 for LED lamps.

The brightness value conversion module 20 is configured to convert the dimming signal into a brightness value. This brightness value corresponds to the output current of one of the DC/DC converters 80. The brightness value conversion module 20 is executed by a single-chip microcomputer N2. Specifically, it can compile and execute commands through a computer language, and send VB, VC, or even assembly language. However, here is not to mention the specific programming language. The Applicant believes that those skilled in the art can write a programming language for executing the command in accordance with the idea of the present invention. Of course, it can be understood that, in order to make the single-chip microcomputer N2 work normally, it also includes some peripheral circuits, which should also be a technique known to those skilled in the art, and details are not described herein again.

The dimming signal switching threshold setting module 30 is configured to preset a size of the dimming signal switching threshold, so that the output of the DC/DC converter 80 is controlled by a amplitude modulated voltage when the brightness value output by the brightness value converting module 20 is greater than the dimming signal switching threshold and the output of the DC/DC converter 80 is controlled by a PWM duty signal when the brightness value output by the brightness value conversion module 20 is less than or equal to the dimming signal switching threshold. Therefore, the dimming signal switching threshold is an output current of the DC/DC converter 80 corresponding to an amplitude dimming voltage. For example, the dimming signal switching threshold may correspond to 150 mA or any other value in the graph (a) of FIG. 3. In the same manner as the brightness value conversion module 20, the dimming signal switching threshold setting module 30 is also executed by the single chip microcomputer N2. Similarly, it can also be programmed by a computer program language.

The determining module 40 is configured to determine a ratio of the brightness value output by the brightness value conversion module 20 to the dimming signal switching threshold set by the dimming signal switching threshold setting module 30. When the brightness value output by the brightness value conversion module 20 is greater than the dimming signal switching threshold, a control signal is output. When the brightness value output by the brightness value conversion module 20 is less than or equal to the dimming signal switching threshold, another control signal is output. Specifically, what function is used by the control signal output by the determining module 40 is described in detail below.

The shutdown module 50 is configured to turn off the output of the second signal output module 70 according to a control signal output by the determining module 40 when the brightness value output by the brightness value conversion module 20 is greater than the dimming signal switching threshold. The method of turning off the second signal output module 70 will be described in detail below. When the brightness value output by the brightness value conversion module 20 is less than or equal to the dimming signal switching threshold, the first and second signal output modules 60, 70 are kept open. Similarly, the determining module 40 and the shutdown module 50 are also executed by the single chip N2. Similarly, the execution command is also written by the computer program language.

The first signal output module 60 outputs an amplitude dimming voltage according to the dimming signal output by the dimming signal input module 10. As for the dimming signal outputted by the dimming signal input module 10, how large is the amplitude dimming voltage output by the first signal output module 60, which is set by the user according to actual needs and the characteristics of the DC/DC converter 80. In order to adapt the signal output by the first signal output module 60 to the DC/DC converter 80, the first signal output module 60 includes a first PWM signal output unit 61 and a filtering unit 62. The first PWM signal output unit 61 outputs a corresponding first PWM signal according to the dimming signal output by the dimming signal input module 10, which is executed by the single chip microcomputer N2. The filtering unit 62 includes a resistor R6 and a capacitor C1. The filtering unit 62 filters the first PWM signal into a voltage signal having constant amplitude to control the output of the DC/DC converter 80. Of course, it can be understood that when the first PWM signal changes due to the dimming signal output by the dimming signal input module 10, the amplitude of the constant amplitude voltage signal changes. Specifically, the resistor R6 is connected in series between the first PWM signal output unit 61 and the DC/DC converter 80, and one end of the capacitor C1 is electrically connected between the resistor R6 and the DC/DC converter 80. The other end of the capacitor C1 is grounded. When the brightness value output by the brightness value conversion module 20 is greater than the dimming signal switching threshold, the first signal output module 60 outputs an amplitude dimming voltage signal to control the output of the DC/DC converter 80 for the purpose of dimming, and at the same time, the shutdown module 50 turns off the output of the second signal output module 70 to avoid interference with the output signal of the second signal output module 70. It is conceivable that when the brightness value output by the brightness value conversion module 20 is greater than the dimming signal switching threshold, the output curve of the DC/DC converter 80 is as shown in diagram (a) of FIG. 3.

The second signal output module 70 outputs a PWM signal according to the dimming signal output by the dimming signal input module 10. As with the first signal output module 60, the parameters of the PWM signal output by the second signal output module 70 are set by the user according to actual needs and the characteristics of the DC/DC converter 80. The second signal output module 70 includes a second PWM signal output unit 71 and a MOS transistor 72. The drain of the MOS transistor 72 is electrically connected between the resistor R6 and the DC/DC converter 80, the source is grounded, and the gate is electrically connected to the second PWM signal output unit 71. It can be understood that when the shutdown module 50 is required to determine the output of the second signal output module 70, the MOS transistor 72 can be turned off as long as the second PWM signal output unit 71 is controlled to output a low level, and then it can achieve the purpose of turning off the output of the second signal output module 70. The second PWM signal output unit 71 is the same as the amplitude signal output unit 61, and is also executed by the single chip microcomputer N2. When the brightness value output by the brightness value conversion module 20 is less than or equal to the dimming signal switching threshold, the second signal output module 70 outputs an amplitude dimming voltage signal equal to the dimming signal switching threshold. The second PWM signal output unit 71 outputs a second PWM signal having a certain duty ratio in accordance with the dimming signal. The second PWM signal will control the on and off of the MOS transistor 72. It can be understood that when the MOS transistor 72 is turned on and off, that is, combined with the amplitude dimming voltage signal output by the first signal output module 70, that is, the second PWM signal modulates the amplitude modulated voltage signal. Thus output a new PWM signal with the dimming signal switching threshold as the amplitude and the duty ratio of the second PWM signal as the duty ratio of the PWM signal input to the DC/DC converter 80. The output of the DC/DC converter 80 is then adjusted by the new PWM signal to achieve the purpose of dimming. It is conceivable that when the brightness value output by the brightness value conversion module 20 is less than or equal to the dimming signal switching threshold, the output curve of the DC/DC converter 80 is as shown in FIG. 3(b). When the maximum value of the new PWM signal, that is, the duty ratio of the PWM signal is 100%, the threshold value is switched for the dimming signal. And the maximum value of the new PWM signal, that is, when the duty ratio of the PWM signal is 100%, is the dimming signal switching threshold.

Compared with the prior art, the dimming system for LED lamps provided by the present invention, when high brightness, that is, when the brightness value output by the brightness value conversion module 20 is greater than the dimming signal switching threshold, due to use the amplitude dimming voltage for dimming so that true dimming without strobe can be achieved. In the case of low brightness, that is, when the brightness value output by the brightness value conversion module 20 is less than or equal to the dimming signal switching threshold, a lower analog voltage value, that is, the dimming signal switching threshold is used to adjust the dimming PWM signal with higher frequency to achieve dimming, so that the dimming depth can be adjusted infinitely, that is, the lamp to which the DC/DC converter 80 is connected can be completely dark.

The above disclosure has been described by way of example and in terms of exemplary embodiment, and it is to be understood that the disclosure is not limited thereto. Rather, any modifications, equivalent alternatives or improvement etc. within the spirit of the invention are encompassed within the scope of the invention as set forth in the appended claims.

The invention claimed is:

1. A dimming system for LED lamps, comprising a DC/DC converter, characterized in that: the dimming system for LED lamps comprises a dimming signal input module, and a brightness value conversion module electrically connected to the dimming signal input module, a dimming signal switching threshold setting module, a first signal output module, and a second signal output module, the dimming signal input module is configured to input a dimming signal, the brightness value conversion module is configured to convert the dimming signal into a brightness value, and the dimming signal switching threshold setting module is configured to preset a size of the dimming signal switching threshold to determine which one of the first and second signal output modules to control the output of the DC/DC converter, and when the brightness value is greater than the dimming signal switching threshold, the first signal output module outputs an amplitude dimming voltage to adjust the output of the DC/DC converter and turning off the output of the second signal output module, when the brightness value is greater than or equal to the dimming signal switching threshold, the value of the amplitude dimming voltage output by the first signal output module is equal to the dimming signal switching threshold while the second signal output module outputs a PWM signal, and the PWM signal modulates the amplitude dimming voltage whose amplitude is equal to the dimming signal switching threshold and then adjusts the output of the DC/DC converter.

2. The dimming system for LED lamps as claimed in claim 1, wherein the dimming system for LED lamps further includes a determining module, and the determining module is configured to determine whether the brightness value output by the brightness value conversion module is greater than the dimming signal switching threshold.

3. The dimming system for LED lamps as claimed in claim 1, wherein the input signal of the dimming signal input module is an analog signal of 0 to 10 volts or a PWM digital signal.

4. The dimming system for LED lamps as claimed in claim 1, wherein the first signal output module includes a first PWM signal output unit, and a filtering unit, and the first PWM signal output unit outputs a corresponding PWM signal according to the dimming signal of the input of the dimming signal input module, the filtering unit includes a resistor (R6) and a capacitor (C1).

5. The dimming system for LED lamps as claimed in claim 4, wherein the resistor (R6) is connected in series between the first PWM signal output unit and the DC/DC converter, and one end of the capacitor (C1) is electrically connected between the resistor (R6) and the DC/DC converter, and the other end of the capacitor (C1) is grounded.

6. The dimming system for LED lamps as claimed in claim 4, wherein the second signal output module includes a second PWM signal output unit, and a MOS transistor, the drain of the MOS transistor is electrically connected between the resistor (R6) and the DC/DC converter, and the source is grounded, the pole is electrically connected to the second PWM signal output unit.

7. The dimming system for LED lamps as claimed in claim 6, wherein when the brightness value is greater than the dimming signal switching threshold, the first PWM signal output unit outputs a corresponding first PWM signal according to an output dimming signal of the dimming signal input module, the dimming system for LED lamps further includes a shutdown module, when the brightness value is greater than the dimming signal switching threshold, the shutdown module turns off an output of the second PWM signal output unit to turn off the MOS transistor.

8. The dimming system for LED lamps as claimed in claim 6, wherein when the brightness value is less than or equal to the dimming signal switching threshold, the second PWM signal output unit outputs a corresponding second PWM signal according to the output dimming signal by the dimming signal input module, the first PWM signal output unit outputs a corresponding first PWM signal according to the output dimming signal by the dimming signal input module and is filtered by the filtering unit to form a constant voltage value.

9. The dimming system for LED lamps as claimed in claim 8, wherein the magnitude of the constant voltage value is equal to the dimming signal switching threshold.

* * * * *